United States Patent

Hill et al.

[15] 3,685,375
[45] Aug. 22, 1972

[54] APPARATUS FOR CONTROLLING MACHINE TOOLS

[72] Inventors: Roger Gettys Hill, 5000 Windpoint Dr., Racine, Wis. 53402; George A. Hoffman, 2606 Westwood Dr., Racine, Wis. 53404

[22] Filed: Sept. 4, 1970

[21] Appl. No.: 69,907

Related U.S. Application Data

[63] Continuation of Ser. No. 716,193, March 26, 1968, abandoned.

[52] U.S. Cl. ............... 82/11, 82/DIG. 4, 318/570, 51/49
[51] Int. Cl. .................................. B23b 5/08
[58] Field of Search ........... 82/2 B, 11, 24, DIG. 4; 90/13.99; 318/570; 51/49

[56] References Cited

UNITED STATES PATENTS

| 3,174,367 | 3/1965 | Lukens | 82/2 B |
|---|---|---|---|
| 3,226,649 | 12/1965 | Kelling | 82/2 B |
| 3,461,612 | 8/1969 | Parrella et al. | 51/49 |
| 3,456,394 | 7/1969 | Welsh | 51/49 |

*Primary Examiner*—Leonidas Vlachos
*Attorney*—Darby & Darby

[57] ABSTRACT

Apparatus for use in controlling the position of a tool relative to a workpiece for the purpose of machining a crowned roll, comprises motor control means for causing relative movement between the tool and roll with respect to a cross axis perpendicular to the longitudinal axis of the roll such that the position of the tool relative to the roll as measured along the cross axis is equal to $Hz^2/C$, where $z$ represents the tool position relative to the roll as measured along its longitudinal axis, and $H$ and $C$ are constants which determine, respectively, the arc height and arc length of the crown.

6 Claims, 4 Drawing Figures

INVENTORS
ROGER GETTYS HILL
GEORGE A. HOFFMAN

BY Darby & Darby
ATTORNEYS

APPARATUS FOR CONTROLLING MACHINE TOOLS

This is a continuation of application Ser. No. 716,193, filed Mar. 26, 1968 and now abandoned.

The present invention relates to the control of machine tools, and, in particular, to the control of a cutting tool (e.g., of a lathe) for the purpose of forming a crowned roll.

It is customary in the machining of cylindrical objects (hereinafter referred to as "rolls") to form a slight crown on the roll. This means that the diameter at the center of the roll is slightly larger than the diameter of the roll at its ends. The main reasons for forming such crowns is to assist in the guiding of a web-like material through the rolls, and/or to compensate for distortion of the roll when it is under pressure.

It is generally believed that the cross-sectional shape of the curve defining the crown should be circular. Since, typically, the height of the crown may be only a few thousandths of an inch for an arc length of 2 or 3 feet, special steps must be taken in order to machine a properly shaped crown with the required accuracy. In this respect, the prior art has restored to tracing devices in which movement of a cutting tool with respect to the roll is controlled by the position of a stylus relative to a suitably shaped template. A tracing system, when used for this purpose, has drawbacks from both the viewpoints of cost and accuracy, the formation of the template alone involving substantial additional expense.

The prior art has also used systems in which the circular shape of the curve is approximated by a straight line taper. Prior art devices of this nature cause the cross slide of the lathe to follow a spring loaded linear cam so that the cross axis position of the cutting edge relative to the roll is mechanically controlled as a linear function of longitudinal displacement. Besides the obvious drawback involved in so roughly approximating the desired curve, prior art systems of this nature are not suitable for some purposes because of the size of the mechanical components required and the general lack of versatility in an all mechanical system.

Accordingly, the main object of the present invention is to provide an improved apparatus for machining crowned rolls wherein the above-mentioned deficiencies of the prior art are substantially overcome.

Briefly, in accordance with the invention, means are provided to control the cross axis position of a cutting tool (e.g., of a lathe) with respect to the work piece (e.g., the roll) in response to an electrical control signal which is dependent upon the position of the tool with respect to the roll as measured along its longitudinal axis. Preferably, this control signal has an amplitude equal to a constant (which can be varied by changing the circuit parameters) times the square of the longitudinal displacement of the tool relative to the roll.

Figure 1:
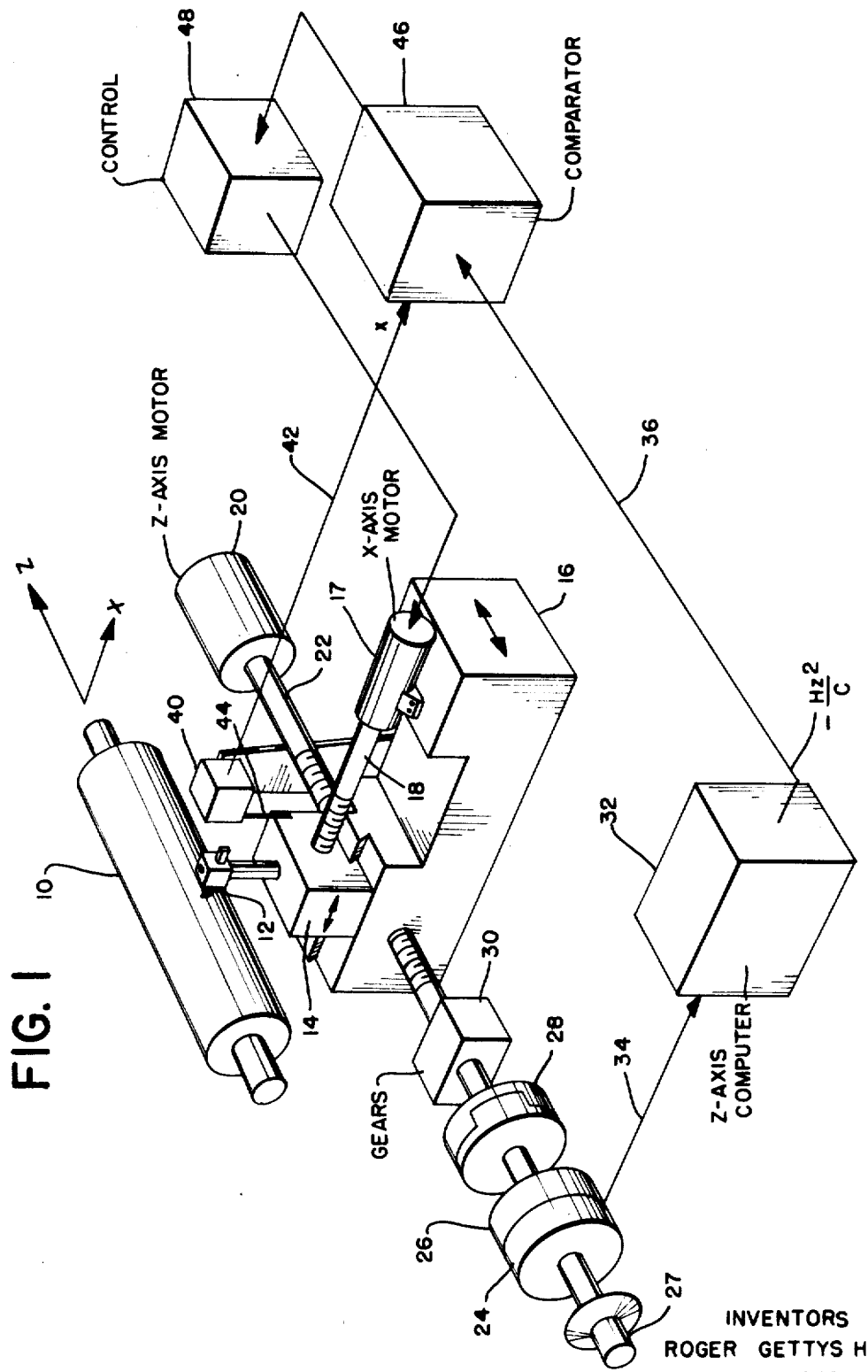
FIG. 1 is a block diagram of a preferred embodiment of the invention.
Figure 3B:
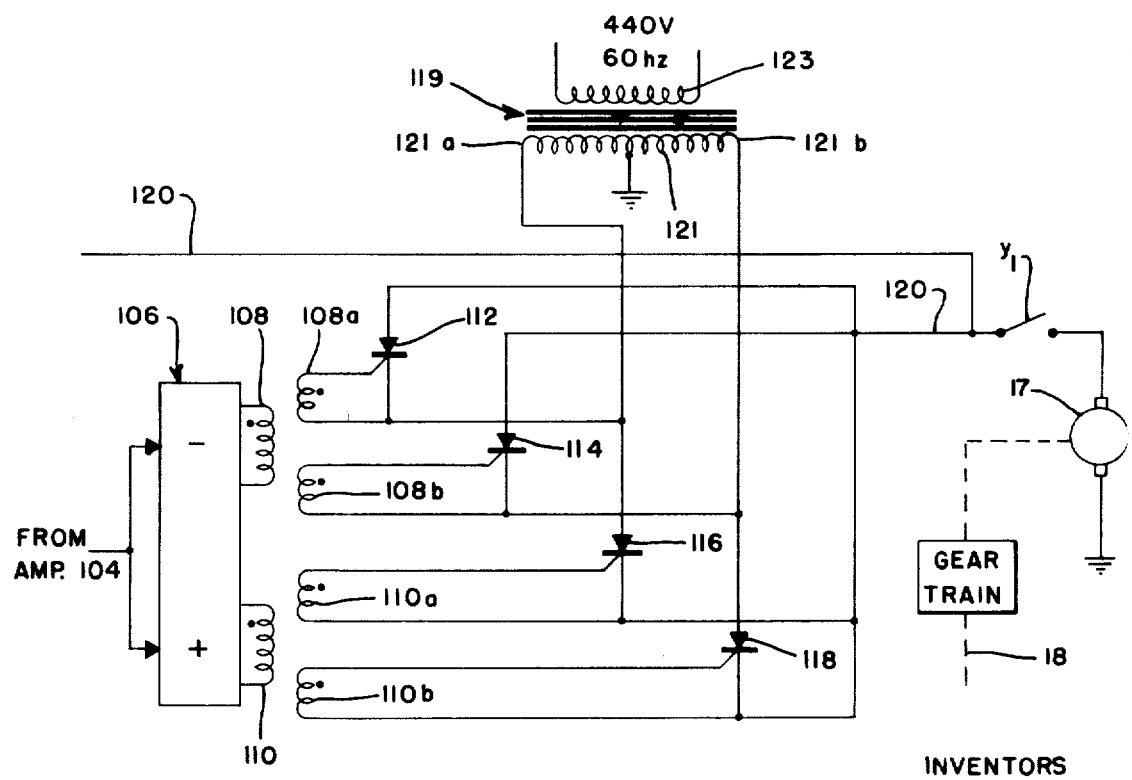
Figure 3A:
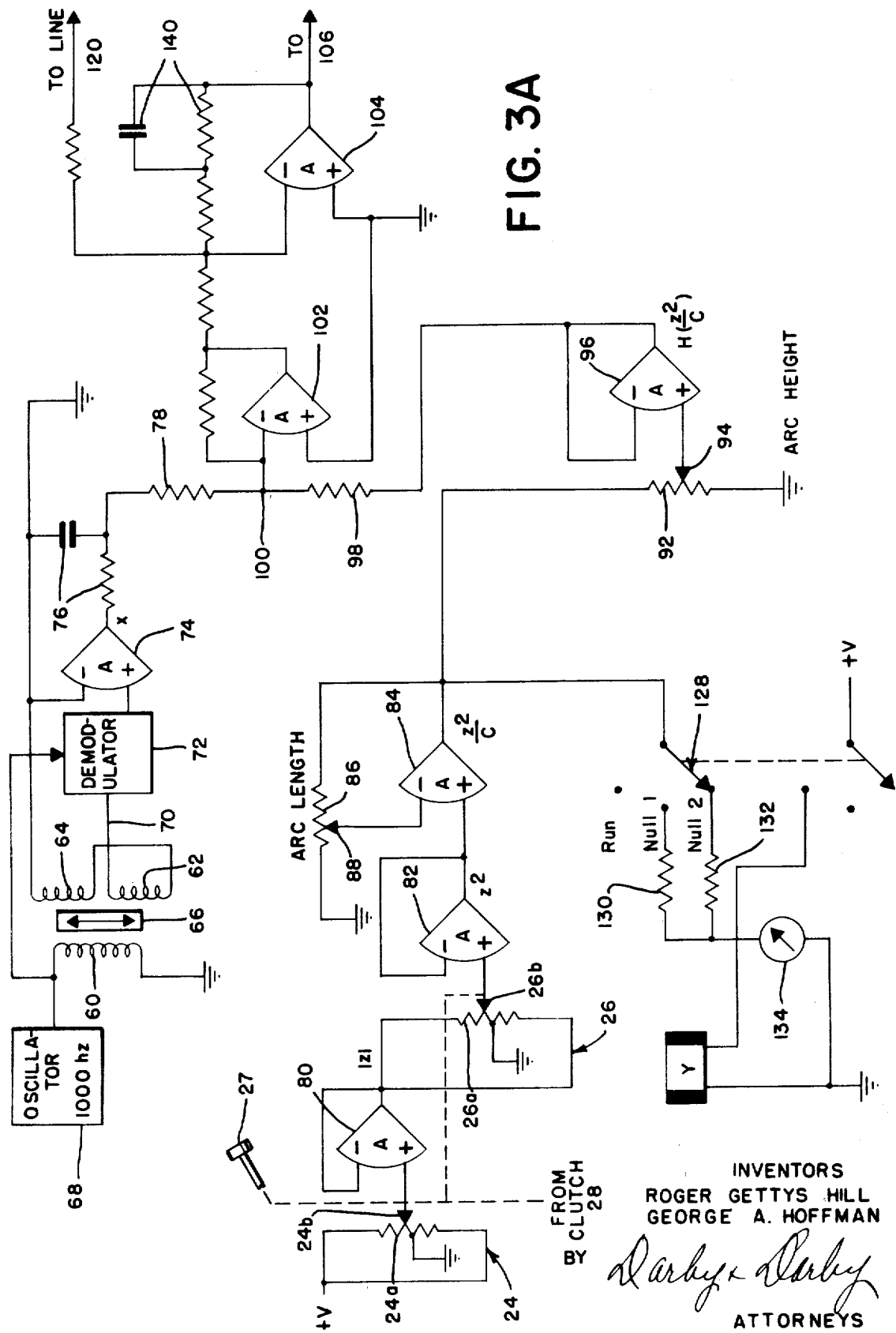

FIGS. 3A and 3B comprise a more detailed schematic diagram of the circuit represented in FIG. 1.

The present invention is intended specifically for the purpose of machining crowned rolls as described above, and, in this respect, the invention is believed to have its basic utility. However, it will be apparent to those skilled in the art that the principles of the invention can be applied to workpieces other than rolls and, of course, to machine tools other than lathes and other cutting or grinding tools. However, to facilitate the following explanation, the preferred embodiment of the invention will be described for use in its specially intended context, namely, the forming of a roll by means of a lathe.

In FIG. 1, the workpiece is shown as a roll 10 and the cutting tool of the lathe is shown at 12. The cutting tool 12 is mounted on a cross slide 14 which is movable along a cross axis X on top of a longitudinal slide 16. The longitudinal slide 16 is movable along the longitudinal axis of the roll 10 which is shown as Z in FIG. 1. In this particular situation, the roll 10 does not move with respect to the Z and X axes, but will, of course, be mounted in a head stock and tail stock (not shown) and rotated by suitable means so as to be cylindrically formed.

As schematically represented in FIG. 1, a cross axis motor 17 is mounted on the longitudinal slide 16 and causes the cross axis movement of the cross slide 14 by means of a lead screw 18 which is threadedly received within slide 14.

In the same way, a longitudinal axis motor 20 causes movement of longitudinal slide 16 by means of a longitudinal lead screw 22. The construction so far described is conventional and, for example, would be essentially the type of system used in a tracer system.

A Z axis position sensor, comprising potentiometers 24 and 26, is coupled to the longitudinal lead screw 22 by means of a clutch 28 and gear train 30. The movable wiper arms of the potentiometers 24 and 26 (not shown in FIG. 1) are both mechanically coupled to lead screw 22, and the potentiometers are electrically connected to a Z axis computer 32 via line 34, as explained with reference to FIG. 3A. According to the preferred embodiment of the invention, computer 32 produces on its output line 36 an electrical voltage which is equal to $Hz^2/C$ where $z$ is a variable quantity representative of the displacement of roll 10 with respect to tool 12 as measured along the Z axis, and H and C are constants which, as explained below, determine the length of the roll on which the crown is formed (hereinafter "arc length") and the maximum height of the crown as measured from the surface of the roll (hereinafter "arc height").

There are various ways in which the output of the Z axis computer can be used to cause tool 12 to cut the desired shape. As shown in FIG. 1, a cross axis transducer 40 is arranged to detect the cross axis movement of cross slide 14 and thus the position of tool 12 with respect to roll 10 as measured along the cross axis X. Transducer 40 may comprise a standard linear variable differential transformer (LVDT) which produces an output voltage on line 42, proportional to the deflection of a mechanical feeler 44. Transducer 40 is displaced in proportion to the position of cross slide 14 with respect to slide 16. Thus, the signal on line 42 also represents the cross axis displacement of the roll 10 with respect to tool 12, such displacement hereinafter being designated by the variable $x$.

The signals on line 42 and 36 are fed to a comparator 46 which produces an output signal indicative of which of its two inputs ($x$ and $Hz^2/C$) is the larger. The comparator output signal is fed to a motor control circuit 48 which causes the cross axis motor 17 to position the tool 12 with respect to cylinder 10 along the X axis so as to maintain the signals on line 42 and 36 equal. This means that the cross axis position ($x$) of the tool 12 with respect to cylinder 10 is always equal to a constant (H/C) times the square of the longitudinal position ($z$) of the tool 12 with respect to roll 10. Thus, the system of FIG. 1 continually solves the equation $x = Hz^2/C$.

Figure 2:
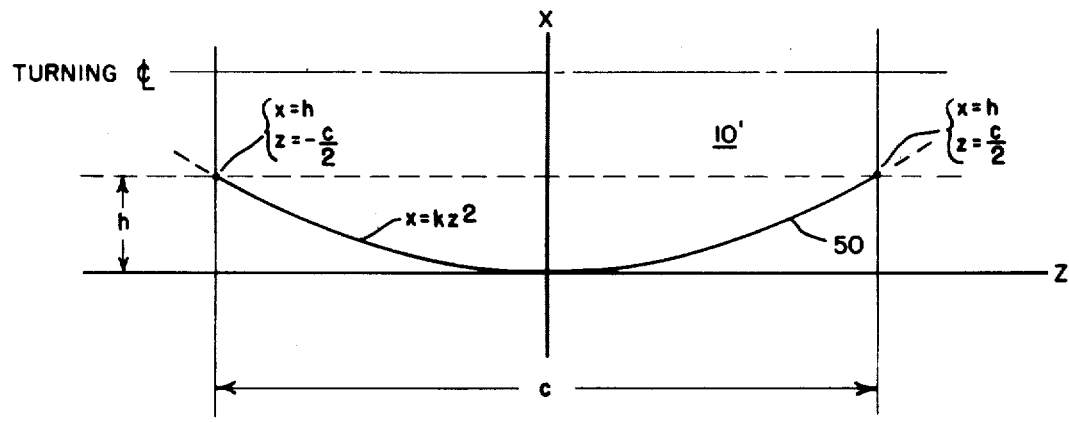
FIG. 2 is a diagram used for explanatory purposes.

FIG. 2 is a plot of tool displacement along the cross axis X versus tool displacement along the longitudinal axis Z for a theoretical crowned roll 10' shown in greatly exaggerated form for purposes of explaining how the basic system operation of FIG. 1 accomplishes the objects of the invention. Roll 10' has been placed with respect to the illustrated coordinates such that the maximum diameter of roll 1-' is tangent to the origin of the graph. For purposes of this description, distances measured along the longitudinal axis Z (designated by $z$) are measured in a positive or negative direction, as the case may be, from the center of the crowned surface of the roll. Distances along the cross axis X (designated by $x$) are measured positively with the maximum arc height equal to zero.

As shown in FIG. 2, the roll 10 may be considered to have an arc length equal to $c$ with the crown having an arc height equal to $h$. The shape of the curve 50 defining the crown in a parabola which may be represented by the equation $x = kz^2$ where $k$ is a constant. At the ends of the roll 10' (i.e., $z = \pm c/2$), the tool position along the X axis will be equal to $h$. Hence, since $k = x/z^2$, if $x = h$ and $z = c/2$, then $k = 4h/c^2$ or $= H/C$, where $H = 4h$ and $C = c^2$ Since H represents the arc height of the crown and C represents the arc length, if these parameters are made separately adjustable, it is possible for curve 50 to have the shape of any desired parabola. Obviously, if the cross axis movement of slide 14 is controlled, so that curve 50 defines the path of tool 12 relative to roll 10, the desired roll 10' will be formed. The manner in which these parameters can be adjusted to define a preselected curve is now explained with reference to FIGS. 3A and 3B. Where possible, those parts which correspond to the parts illustrated in FIG. 1 are referred to by the same numeral.

The LVDT 40 consists of a primary coil 60 and secondary coils 62 and 64 arranged in a conventional fashion to detect movement of a core 66 which may be directly connected to the feeler 44. The primary coil 60 is energized by an oscillator 68 which, for example, may produce a 1,000 Hz output. The output of the LVDT secondary appears on line 70 and comprises an alternating voltage having a magnitude proportional to the position of core 66 (and thus the deflection of feeler 44) and a phase indicative of the direction in which such deflection occurs (i.e., in or out with respect to an initial reference point). The voltage on line 70, along with the oscillator output, is fed to a demodulator 72, the output of which comprises a positive or negative direct voltage in which amplitude and polarity, respectively, indicate the magnitude and direction of deflection. In the preferred embodiment, deflection of the feeler is always in one direction so that it can be assumed that the output of demodulator 72 is always of a given polarity (e.g., negative).

The demodulator output is amplified by amplifier 74 and coupled through an RC filtering circuit 76 (which removes the 2,000 hertz ripple frequency) to a summing resistor 78. Thus, the voltage across resistor 78 represents the cross axis displacement $x$ of the tool 12 with respect to roll 10.

As stated above, the Z axis signal is derived from the potentiometers 24 and 26. Potentiometer 24 consists of a center tapped resistive winding 24a and a wiper arm 24b. Both ends of the resistor 24a are connected to a positive voltage source and the center tap is grounded. The wiper 24b is connected to an operational amplifier 80 which produces an output representative of the absolute value of the position of the tool 12 with respect to roll 10 as measured along the longitudinal axis Z.

The amplifiers (such as 80) used in the preferred embodiment of the invention are operational amplifiers which are high gain DC amplifiers generally incorporating a negative feedback loop. By proper selection of the feedback components, operational amplifiers can be made to perform a wide variety of mathematical operations. The triangular symbol used in FIG. 3A to represent an operational amplifier is standard, the plus (+) and minus (−) signs indicating that the input on the associated line causes an output of the same or opposite polarity, respectively.

The output of amplifier 80 is connected to both ends of the potentiometer resistor 26a, the center tap of which is grounded. The wiper arms 24b and 26b are mechanically linked together (and driven by the longitudinal lead screw 22), so that the voltage on the wiper arm 26b will be equal to the square of the tool position as measured along the longitudinal axis Z (i.e., $z^2$). This is a standard circuit in the analog computer arts for squaring a quantity. A second operational amplifier 82, the input of which is coupled to the wiper arm 26b, thus produces an amplified voltage proportional to $z^2$ on its output.

To alter the shape of the crown to satisfy different operating requirements, as explained previously, it is necessary to introduce a constant which may be considered as equal to H/C where C determines the arc length and H determines the arc height of the crown. Thus, a third operational amplifier 84 is responsive to the output of amplifier 82. Amplifier 84 contains in its negative feedback loop a voltage divider network comprising a resistor 86 and wiper arm 88. By adjusting the gain in the negative feed back loop, the gain of amplifier 84 is changed by a factor of 1/C where C is a constant determined by the position of wiper 88. Accordingly, the output of amplifier 84 is a voltage proportional to $z^2/C$. This voltage is coupled across a second voltage dividing resistor 92 which includes a wiper arm 94 and functions to introduce the constant H in an obvious fashion at the input of a fifth operational amplifier 96. The output of amplifier 96 (which represents $Hz^2/C$) is coupled across a second summing resistor 98 so that the voltage at junction 100 of summing resistors 78 and 98 is equal to the difference between the cross axis displacement $x$ and the square of the longitudinal axis displacement $z$ times a constant (H/C).

If the voltage at junction 100 is maintained equal to zero, the system is continually solving the equation $x = Hz^2/C$, which means that the cutting tool 12 is traversing the desired path with respect to roll 10. In the preferred embodiment of the invention, this is accomplished by amplifying the voltage at junction 100 by means of two additional operational amplifiers 102 and 104 and using this control voltage to drive the axis motor 17 clockwise or counterclockwise, depending on the polarity of the control signal.

The motor control circuit 48 includes a pulse generator 106 (e.g., an SCR firing circuit) which is responsive to the output signal from amplifier 104. Pulse generator 106 includes output coils 108 and 110, on which pulses appear if the output of amplifier 104 is negative or positive, respectively. In other words, if $x$ is greater than $Hz^2/C$, control pulses will appear on coil 108. If $x$ is less than $Hz^2/C$, control pulses will appear on coil 110.

Each of the primary coils 108 and 110 cooperate with a pair of secondary coils 108a, b and 110a, b are connected between the gate and cathode of a silicon control rectifier (SCR) 112, 114, 116 and 118. The anodes of SCR's 112 and 114 and the cathodes of SCR's 116 and 118 are connected to the output line 120.

Conduction of the SCR's is controlled by a transformer 119 having a secondary 121 which as a grounded center tap. One side 121a of secondary 121 is connected to the cathode of SCR 121 and the anode of SCR 116. The other side 121b of secondary 121 is connected to the cathode of SCR 114 and the anode of SCR 118. The primary 123 of transformer 119 is connected across a 440 volt 60 cycle alternating voltage.

The operation of the motor control circuit is as follows. Where control pulses appear on the winding 108, SCR 112 conducts each time side 121a of the transformer secondary is negative, applying a negative pulse to the output line 120. On the next half cycle, when the side 121b is negative, SCR 114 fires, applying a negative voltage to the output line 120. SCR's 116 and 118 cannot conduct because no voltage is applied to their control gates. Where the control pulses appear on the pulse generator winding 110, SCR's 112 and 114 cannot conduct. However, each time the line 121a is positive, SCR 116 will conduct and, on the next half cycle, the positive voltage on line 121 will be conducted through SCR 118 to the output 121. Thus, depending upon the polarity of the signal at the output of amplifier 104, the motor control voltage on line 120 will be positive or negative, thereby determining the direction of rotation of the motor 17.

In the preferred embodiment of the invention, in which an LVDT is used to determine the cross axis displacement signal, it is important to assure that the voltage from amplifier 96 is equal to zero when the longitudinal displacement is equal to zero, i.e., when the tool is positioned at the maximum height of the crown. For this purpose, a nulling circuit is employed. The nulling circuit comprises a manually controllable double pole, triple throw switch 128 settable to three positions indicated as "Run," "Null 1" and "Null 2." In the "Run" position, a relay coil Y is energized which closes its contact yl (see FIG. 3B) to apply the motor control signals to the motor 17. The "Null 1" and "Null 2" positions are essentially the same. In each position the output of amplifier 84 is connected to a current limiting resistor 130 or 132 selected for purposes of sensitivity. Obviously, any desired number of switch positions can be used to increase the sensitivity range of the instrument. In either position, the output of the amplifier 84 is coupled through the resistor 130 or 132 to an ammeter 134 which thus provides a direct reading proportional to $z^2$, i.e., the square of the longitudinal displacement of the tool 12 with respect to the workpiece 10. Accordingly, where workpiece 10 has been positioned with respect to tool 12 so that the tool is resting on the point which will be the point of maximum diameter, the suitable sensitivity range (i.e., "Null 1" or "Null 2") is selected and the reading of the ammeter 134 noted. If it is not zero, the operator of the machine manually adjusts the hand knob 27 (see FIG. 1) until the meter 134 reads zero. Clutch 28 permits wiper arms 24b and 26b to be properly nulled without rotation of longitudinal lead screw 22.

Once the system has been properly nulled, the operating switch 128 is set to the "Run" position which energizes the relay Y, closing contact yl (see FIG. 3B) to apply the proper control voltage on output line 120 to the motor 17. In the preferred embodiment, the motor 17 comprises a d.c. servo motor manufactured by Printed Circuit Motors and sold under the Model No. U-12. When contact yl is closed, the voltage on line 120 also represents the voltage on the armature of the motor and this voltage is fed back to the negative input of amplifier 104 which contains an integrating circuit 140 in its negative feedback loop. This feedback arrangement is customary in servo systems and forms no part of the present invention. In this particular application it is somewhat equivalent to a tachometer feedback.

The operation of the circuit shown in FIGS. 3A and 3B should be apparent from the foregoing description and is now described only in outline terms. After the circuit has been suitably nulled as described above, the wiper arm 88 of the arc length potentiometer 86 is adjusted to its approximate value, which may be indicated directly on the console of the equipment if the potentiometer is suitably calibrated. The tool 12 is then moved to one end of the roll 10 and relay Y energized by placing switch 128 in the "Run" position. The servo system will then drive the X motor 17 until the output of LVDT amplifier 74 equals the output of the amplifier 96. The deflection of the feeler 44 is then measured by any suitable means and the wiper arm 94 of arc height potentiometer 92 adjusted until the measured deflection of feeler 44 is equal to the desired arc height $h$. This assures that the proper amount of gain has been inserted into the system by the potentiometers 86 and 92.

The system is now ready to machine the desired crown, for which purpose it is only necessary to suitably energize longitudinal motor 20 so as to move the roll in the proper direction with respect to the tool 12. A mechanical offset between feeler 44 and cross slide 14 (or any equivalent means) may be provided to adjust the maximum roll diameter (e.g., a small offset for a "rough" cut and a larger offset for "finish" cutting). The fact that is not necessary to reverse the position of the workpiece in a supporting chuck substantially simplifies formation of a crown (including a linearly tapered one) where the roll must be supported on asymmetrical journals or the like.

The principles of the invention are applicable to the formation of crowns having any desired shape. Although not definitely known, it is believed that the most desirable shape for the curve is circular, and experience indicates that a parabolic equation so closely approximates a circle where the radius is large, that the effect is the same. However, any desired equation can be generated and employed in accordance with the invention to position the tool with respect to the roll along the cross axis. If it were desired to use a linear equation, it is only necessary to insert a switch into the circuit of FIG. 3A to bypass the potentiometer 26a and amplifier 82.

It is also possible, pursuant to the invention, for the user to merely "dial in " the desired arc length and height without actually determining the required deflection as explained above with reference to the preferred embodiment of the invention. This is a matter of practical considerations and, in fact, it may be possible in some situations to dispense with the use of the separate arc length and arc height potentiometers 86 and 92, respectively, if the necessary gain can be inserted into the circuit by other means (e.g., a single potentiometer properly located in the circuit).

The invention also does not require the use of any specific means for generating an X axis signal. In place of the preferred LVDT 40, the wiper of a potentiometer similar to potentiometer 24 or 26 may be coupled to the cross axis lead screw 18 so that a voltage appearing thereon is proportional to cross axis displacement. Moreover, it is not necessary to compare the Z axis and X axis displacement, and, instead, the longitudinal displacement can be measured and used directly to control a cross axis positioning means.

It is also contemplated that the principles of the invention as herein described can be used in the machining of any article (i.e., other than cylindrical objects) a surface of which, as measured along one axis, varies as a function of the relative position of a tool and the workpiece as measured along a second axis. Various other modifications of the invention will also be obvious to those skilled in the art and the invention should be defined with reference to the following claims.

What is claimed is:

1. Apparatus for use in machining a crowned roll or the like wherein the shape of the crown can be expressed as a function of the longitudinal displacement of the tool relative to the workpiece, comprising:
   first means for moving a tool with respect to said roll in a direction generally parallel to the longitudinal axis of said roll;
   second means for moving said tool with respect to said roll in a direction parallel to a cross axis which is generally transverse to said longitudinal axis;
   means responsive to said first moving means for producing a first voltage which is dependent upon the position of the tool with respect to said roll as measured along said longitudinal axis, said first voltage producing means including at least two potentiometers, the wipers of said potentiometers being driven by said first moving means, with the voltage across one potentiometer being derived from the wiper of the other potentiometer, said first voltage being derived from the wiper of said one potentiometer;
   function generator means responsive to said first voltage for producing a continuously variable voltage which varies with the displacement of the tool relative to the roll along the longitudinal axis in accordance with said function;
   means for producing a second voltage which is an electrical analog of the position of said tool with respect to said roll as measured along said cross axis; and
   control means responsive to said variable and second voltages for causing said second moving means to move said tool relative to said roll to a position at which the cross axis displacement of the roll relative to the tool is equal to said preselected function of the roll position with respect to said tool as measured along said longitudinal axis, said control means comprising means for comparing the magnitudes of said first and second voltages, and means for causing said second moving means to continuously move said tool so as to maintain said first and second voltages equal.

2. Apparatus according to claim 1, wherein said function generator means includes means for varying said preselected function so as to determine the shape of the machined crown.

3. Apparatus according to claim 1, wherein said first voltage is proportional to $z^2$, where $z$ represents the position of the roll with respect to said tool as measured along said longitudinal axis, and wherein said function generator means includes first amplifier means for producing a voltage equal to $z^2/C$, where C is a constant, and second amplifier means for multiplying the voltage $z^2/C$ by a second constant.

4. Apparatus for use in machining a crowned roll or the like, wherein there is provided first means for moving a tool with respect to said roll in a direction generally parallel to the longitudinal axis of said roll, second means for moving said tool with respect to said roll along a cross axis which is generally transverse to said longitudinal axis, the improvement comprising:
   means for producing a first voltage which is proportional to the displacement of the tool relative to the workpiece along the longitudinal axis, said first voltage producing means including at least two potentiometers, the wipers of said potentiometers being driven by said first moving means, with the voltage across one potentiometer being derived from the wiper of the other potentiometer, said first voltage being derived from the wiper of said one potentiometer;
   function generator means responsive to said first voltage for producing a first analog voltage equal to $kz^n$, where $k$ equals a constant other than zero, $z$ represents the position of the tool with respect to said roll as measured along said longitudinal axis, and $n$ is any number other than zero;
   means for producing a second analog voltage dependent upon the position of the tool relative to the roll as measured along said cross axis;
   control means including means for comparing said first and second analog voltages; and
   means responsive to said control means for causing said second moving means to move said tool with respect to said roll along said cross axis.

5. Apparatus according to claim 4, wherein said function generator means includes means for varying the magnitude of said first voltage so as to determine the shape of the machined crown.

6. Apparatus according to claim 4, wherein said function generator means includes means for producing a voltage equal to $z^2$, where $z$ represents the position of the roll with respect to said tool as measured along said longitudinal axis, first amplifier means for producing a voltage equal to $z^2/C$, where C is a constant, and second amplifier means for multiplying the voltage equal to $z^2/C$ by a second constant H.

* * * * *